United States Patent
Liu

(10) Patent No.: US 12,189,604 B2
(45) Date of Patent: Jan. 7, 2025

(54) DATA PROCESSING METHOD AND APPARATUS FOR BLOCKCHAIN NETWORK, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 2 days.

(21) Appl. No.: 18/315,273

(22) Filed: May 10, 2023

(65) Prior Publication Data
US 2023/0273912 A1  Aug. 31, 2023

Related U.S. Application Data

(63) Continuation of application No. PCT/CN2022/099881, filed on Jun. 20, 2022.

(30) Foreign Application Priority Data

Aug. 9, 2021  (CN) .......................... 202110906607.6

(51) Int. Cl.
| | | |
|---|---|---|
| G06F 16/23 | (2019.01) | |
| G06F 21/64 | (2013.01) | |
| G07C 13/00 | (2006.01) | |

(52) U.S. Cl.
CPC ......... *G06F 16/2315* (2019.01); *G07C 13/00* (2013.01)

(58) Field of Classification Search
None
See application file for complete search history.

(56) References Cited

U.S. PATENT DOCUMENTS

| | | | |
|---|---|---|---|
| 10,534,634 B2 * | 1/2020 | Yang | G06F 11/187 |
| 2019/0172026 A1 * | 6/2019 | Vessenes | G06Q 20/065 |

(Continued)

FOREIGN PATENT DOCUMENTS

| | | |
|---|---|---|
| CN | 111355810 A | 6/2020 |
| CN | 111683118 A | 9/2020 |

(Continued)

OTHER PUBLICATIONS

Freya Sheer Hardwick; E-Voting With Blockchain: An E-Voting Protocol with Decentralisation and Voter Privacy; 2016; IEEE; pp. 1-7 (Year: 2016).*

(Continued)

*Primary Examiner* — Albert M Phillips, III
*Assistant Examiner* — Jermaine A Mincey
(74) *Attorney, Agent, or Firm* — ANOVA LAW GROUP PLLC

(57) ABSTRACT

A data processing method includes: generating, when a consensus node in a blockchain network does not obtain a block proposal message of a first master node in a proposal stage, a node handover proposal message, and broadcasting the node handover proposal message to a plurality of consensus nodes in the blockchain network, the first master node being configured to package and propose a block to be added to the blockchain network; generating, when a number of node handover proposal messages obtained in a voting stage is not less than the target number, a node handover voting message, and broadcasting the node handover voting message to the consensus nodes in the blockchain network; and re-selecting, when a number of node (Continued)

handover voting messages obtained in a commit stage is not less than the target number, a second master node from the plurality of consensus nodes for replacing the first master node.

18 Claims, 9 Drawing Sheets

(56) References Cited

U.S. PATENT DOCUMENTS

2020/0059369 A1     2/2020   Li et al.
2023/0066467 A1     3/2023   Liu

FOREIGN PATENT DOCUMENTS

| CN | 111698315 A | 9/2020 |
| CN | 112202933 A | 1/2021 |
| CN | 113342902 A | 9/2021 |

OTHER PUBLICATIONS

Ahmed Alquraan; An Analysis of Network-Partitioning Failures in Cloud Systems; USENIX Symposium; pp. 1-19 (Year: 2018).*
The World Intellectual Property Organization (WIPO) International Search Report for PCT/CN2022/099881 Sep. 21, 2022 13 Pages (including translation).

* cited by examiner

DATA PROCESSING METHOD AND APPARATUS FOR BLOCKCHAIN NETWORK, COMPUTER DEVICE, AND COMPUTER-READABLE STORAGE MEDIUM

CROSS-REFERENCES TO RELATED APPLICATIONS

This application is a continuation application of PCT Patent Application No. PCT/CN2022/099881, entitled "DATA PROCESSING METHOD AND APPARATUS FOR BLOCKCHAIN NETWORK, COMPUTER DEVICE, COMPUTER READABLE STORAGE MEDIUM, AND COMPUTER PROGRAM PRODUCT" and filed on Jun. 20, 2022, which claims priority Chinese Patent Application No. 202110906607.6 filed on Aug. 9, 2021, and claims priority to the Chinese patent application, the entire contents of both of which are incorporated herein by reference.

FIELD OF THE TECHNOLOGY

The present disclosure relates to the field of blockchain technology, and in particular, to a data processing method and apparatus for a blockchain network, a computer device, a computer-readable storage medium, and a computer program product.

BACKGROUND OF THE DISCLOSURE

Blockchain is a new application mode of computer technologies such as distributed data storage, point-to-point transmission, consensus mechanism, and encryption algorithm. Blockchain, essentially a decentralized database, is a string of data blocks generated in association with a cryptographic method. Each data block includes information of a batch of network transactions and is configured to verify the validity (anti-counterfeiting) of the information and generate a next block.

A blockchain network includes a master node that packages and proposes a block. When the master node delays the proposal of the block, handover of the master node may be requested. In existing applications, when handover of the master node is required, consensus nodes in the blockchain network are required to additionally generate a request for handover of the master node outside a block consensus process, respectively, and broadcast said request to each other. The request is also required to carry its own state information to implement handover of the master node through the request. Hence, since the consensus nodes broadcast, to each other, a master node handover request additionally generated by the consensus nodes respectively and including the state information of the consensus nodes, it brings a great communication burden to the blockchain network, and the master node handover efficiency is low.

SUMMARY

Embodiments of the present disclosure provide a data processing method and apparatus for a blockchain network, a computer device, a computer-readable storage medium, and a computer program product, which may improve the master node handover efficiency.

The embodiments of the present disclosure provide a data processing method for a blockchain network, the blockchain network supporting data processing for a block consensus service, the block consensus service including a proposal stage, a voting stage, and a commit stage, the blockchain network including a plurality of consensus nodes, the method being applied to any consensus node among the plurality of consensus nodes, the consensus node including at least one computer device, and the method including: generating, when a block proposal message generated by a first master node is not obtained in the proposal stage, a node handover proposal message, and broadcasting the generated node handover proposal message to the plurality of consensus nodes in the blockchain network; the first master node being one of the plurality of consensus nodes, and the first master node being configured to package and propose a block to be added to the blockchain network; generating, when a number of node handover proposal messages obtained in the voting stage is not less than a target number, a node handover voting message, and broadcasting the generated node handover voting messages to the plurality of consensus nodes in the blockchain network; and re-selecting, when a number of node handover voting messages obtained in the commit stage is not less than the target number, a second master node from the plurality of consensus nodes for replacing the first master node.

The embodiments of the present disclosure provide a data processing apparatus for a blockchain network, the blockchain network supporting data processing of a block consensus service, the block consensus service including a proposal stage, a voting stage, and a commit stage, the blockchain network including a plurality of consensus nodes, the apparatus being applied to any consensus node among the plurality of consensus nodes, and the apparatus including: a proposal module, configured to generate, when a block proposal message generated by a first master node is not obtained in the proposal stage, a node handover proposal message, and broadcast the generated node handover proposal message to the plurality of consensus nodes in the blockchain network; the first master node being one of the plurality of consensus nodes, and the first master node being configured to package and propose a block to be added to the blockchain network; a voting module, configured to generate, when a number of node handover proposal messages obtained in the voting stage is not less than a target number, a node handover voting message, and broadcast the generated node handover voting message to the plurality of consensus nodes in the blockchain network; and a node handover module, configured to re-select, when a number of node handover voting messages obtained in the commit stage is not less than the target number, a second master node from the plurality of consensus nodes for replacing the first master node.

The embodiments of the present disclosure provide a computer device, including a memory and a processor, the memory storing a computer program, and the computer program, when executed by the processor, causing the processor to execute the data processing method for the blockchain network provided by the embodiments of the present disclosure.

The embodiments of the present disclosure provide a non-transitory computer-readable storage medium, the computer-readable storage medium storing a computer program, the computer program including a program instruction, and the program instruction, when executed by a processor, causing the processor to execute the data processing method for the blockchain network provided by the embodiments of the present disclosure.

Through the embodiments of the present disclosure, a handover judgment process of the master node may be added into the process of implementing the block consensus service, without employing an additional process to generate an additional master node request to implement handover judgment of the master node. Therefore, the master node handover process is efficient and unified, thereby improving the utilization of computing resources.

BRIEF DESCRIPTION OF THE DRAWINGS

To describe the technical solutions in the present disclosure or in the related art more clearly, the accompanying drawings for describing the embodiments or the related art are briefly introduced below. Apparently, the accompanying drawings in the following description show merely some embodiments of the present disclosure, and a person skilled in the art may still obtain other accompanying drawings according to the accompanying drawings without creative efforts.

DESCRIPTION OF EMBODIMENTS

Figure 1A:
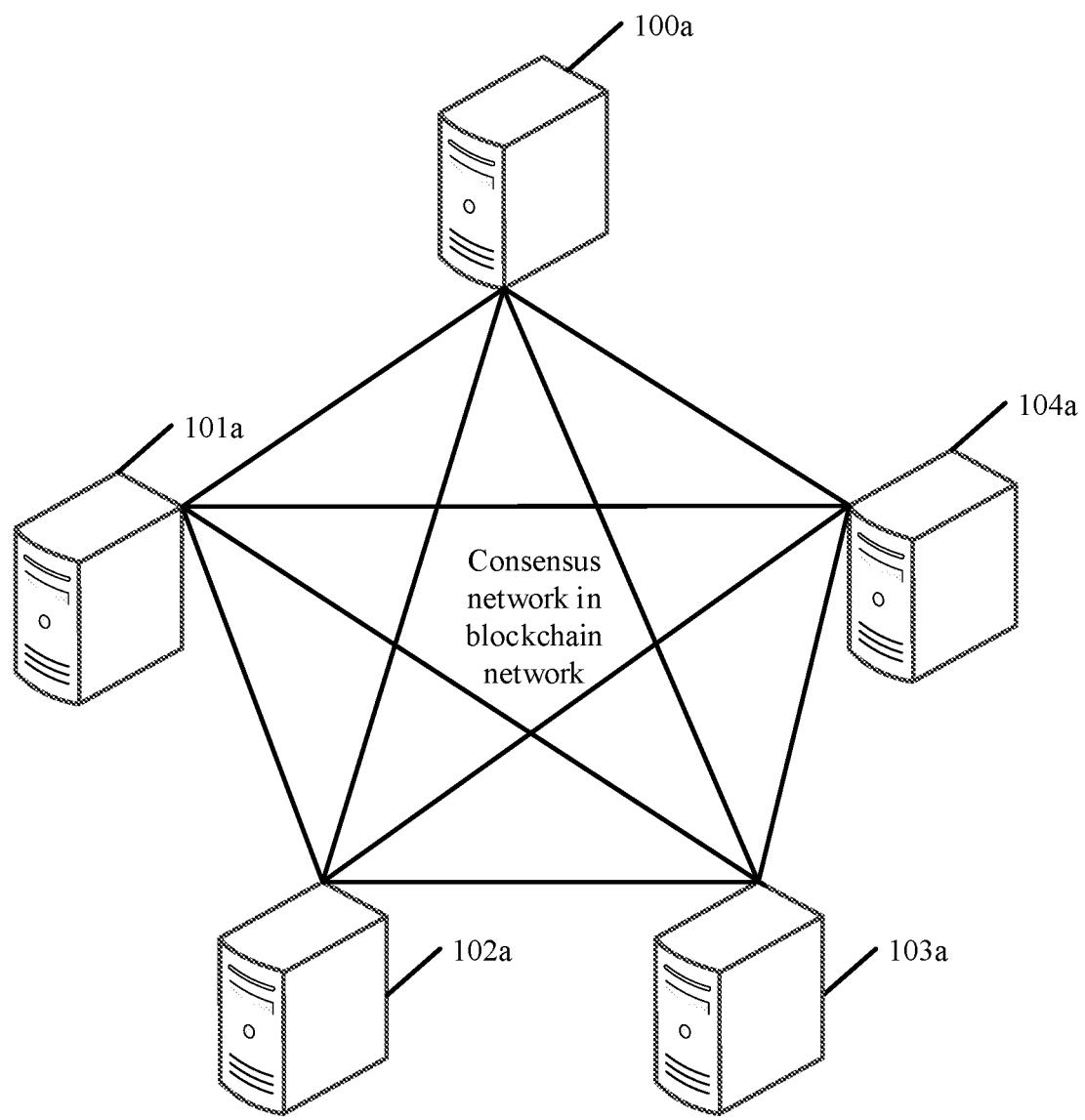
FIG. 1A is a schematic structural diagram of a network architecture provided according to an embodiment of the present disclosure.

The technical solutions in the present disclosure are clearly and completely described below in combination with the accompanying drawings in the present disclosure. Apparently, the described embodiments are merely some rather than all of the embodiments of the present disclosure. All other embodiments obtained by a person skilled in the art on the basis of the embodiments of the present disclosure without making creative efforts shall fall within the protection scope of the present disclosure.

Before the embodiments of the present disclosure are further described in detail, a description is made on nouns and terms in the embodiments of the present disclosure, and the nouns and terms in the embodiments of the present disclosure are applicable to the following explanations.

(1) Proposal is a request for executing a smart contract call (hereinafter referred to as an execution transaction) included in a transaction, which includes an identifier of a channel that receives the transaction, an identifier of a smart contract that needs to be called in the channel, and parameter information that needs to be transmitted to the called smart contract.

(2) Blockchain is an encrypted and chained transaction storage structure formed by blocks. The header of each block may include both hash values of all transactions in the block and hash values of all transactions in the previous block, thereby implementing tamper-proofing and anti-counterfeiting of transactions in the block on the basis of the hash values; and a newly generated transaction is added to the end of the blockchain after being filled into the block and being subjected to the consensus of the nodes in the blockchain network, thereby forming a chain growth.

(3) A blockchain network is a set of a series of nodes in which a new block is incorporated into the blockchain in a consensus manner.

(4) Consensus is a process in the blockchain network, and is used to agree on a transaction in a block among involved nodes, so that the agreed block is added to the tail of the blockchain. A mechanism for implementing the consensus includes Proof of Work (PoW), Proof of Stake (PoS), Delegated Proof of Stake (DPoS), Proof of Elapsed Time (PoET), etc.

The present disclosure further relates to blockchain-related technologies. Blockchain is a new application mode of computer technologies such as distributed data storage, point-to-point transmission, consensus mechanism, and encryption algorithm. Blockchain, essentially a decentralized database, is a string of data blocks generated in association with a cryptographic method. Each data block includes information of a batch of network transactions, and is configured to verify the validity (anti-counterfeiting) of the information and generate a next block. The blockchain may include a blockchain underlying platform, a platform product service layer, and an application service layer. The blockchain includes a series of blocks that are successively connected with each other according to a generated chronological order. Once a new block is added to the blockchain, it will not be removed. The block records record data submitted by nodes in the blockchain system.

FIG. 1A is a schematic structural diagram of a network architecture provided according to an embodiment of the present disclosure. As shown in FIG. 1A, the network architecture may include a consensus network in the blockchain network, the consensus network is a network composed of multiple consensus nodes in the blockchain network, and a consensus node may be composed of one or more servers. Specifically, the consensus network may include a consensus node 100a, a consensus node 101a, a consensus node 102a, a consensus node 103a, and a consensus node 104a.

The server used to form the consensus node in FIG. 1A may be an independent physical server, a server cluster composed of multiple physical servers, or a distributed system, and may also be a cloud server that provides basic cloud computing services such as a cloud service, a cloud database, cloud computing, a cloud function, cloud storage, a network service, cloud communications, a middleware service, a domain name service, a security service, CDN, big data, and an artificial intelligence platform.

Each consensus node in the consensus network in FIG. 1A may perform data processing of a block consensus service. During the process of data processing of the block consensus service, a master node handover judgment process may be performed synchronously in the block consensus process. By taking the consensus node 100a as an example, how to perform master node handover judgment process in the process of data processing of the block consensus service is described below. Referring to the following description, in the process of data processing of the block consensus service, each consensus node has the same master node handover judgment process.

Figure 2:
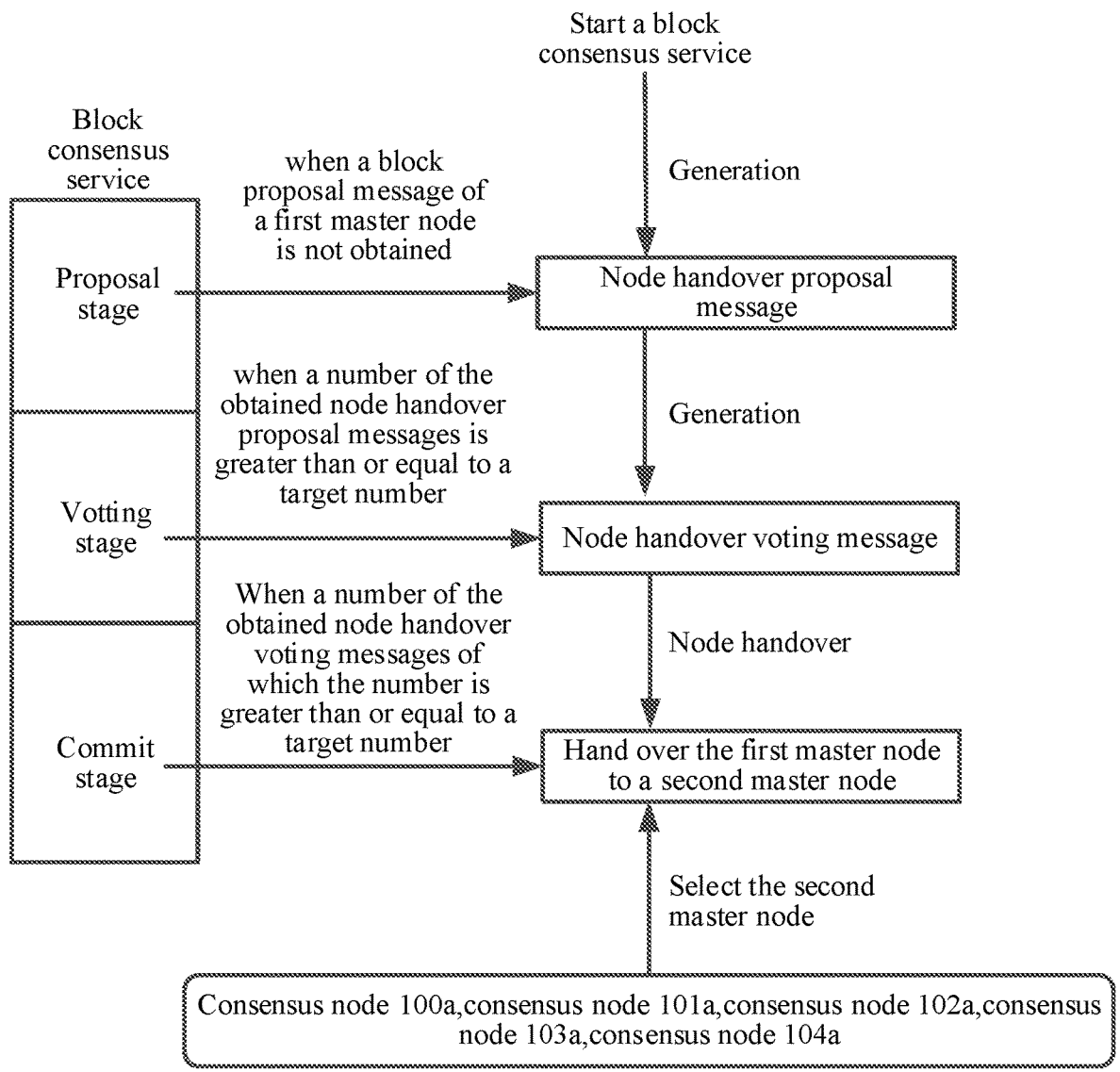
FIG. 2 is a schematic diagram of a scenario of master node handover provided according to an embodiment of the present disclosure.

FIG. 2 is a schematic diagram of a scenario of master node handover provided according to an embodiment of the present disclosure. As shown in FIG. 2, the block consensus service (that is, the service of performing consensus on-chain for a block) may include three service stages: a proposal stage, a voting stage, and a commit stage. The current master node in the foregoing consensus network may be called as a first master node, and the master node in the blockchain network is configured to package and propose a block to be added to the blockchain network.

The consensus node 100a may start the data processing of the block consensus service. First, the data processing of the proposal stage is performed. When the consensus node 100a does not obtain, in the proposal stage, a block proposal message generated by the first master node (the block proposal message is used for proposing the block to be placed on-chain, so as to perform consensus processing for adding the block to the blockchain network), the consensus node 100a may generate a node handover proposal message, the node handover proposal message being used for requesting master node handover of the first master node in the proposal stage. The consensus node 100a may broadcast the generated node handover proposal message to other consensus nodes in the blockchain network, such as the consensus node 101a, the consensus node 102a, the consensus node 103a, and the consensus node 104a.

Then, in the voting stage, when the consensus node 100a obtains the node handover proposal messages (including the message generated by itself and the message broadcast by other consensus nodes) whose number is not less than a target number in the voting stage, the consensus node 100a may generate a node handover voting message, the node handover voting message being a message for requesting the master node handover of the first master node in the voting stage. The consensus node 100a may broadcast the generated node handover voting message to other consensus nodes in the blockchain network. A consensus algorithm used by the consensus network in the blockchain network may be a Byzantine algorithm. Therefore, the number of consensus nodes in the blockchain network may be 3f, and the target number may be 2f+1.

Further, in the commit stage, when the consensus node 100a obtains the node handover voting messages (including the message generated by itself and the messages broadcast by other consensus nodes) whose number is not less than a target number in the commit stage, the consensus node 100a may select a second master node for replacing the first master node from multiple consensus nodes (including the consensus node 100a, the consensus node 101a, the consensus node 102a, the consensus node 103a, and the consensus node 104a) included in the consensus network, and then hands over the first master node to the second master node. In this case, the second master node is a new master node in the blockchain network, and the blockchain network may have one master node at a same time.

According to the data processing method for the blockchain network provided in the embodiments of the present disclosure, a master node handover judgment process may be added in the process of performing the block consensus service, so that the master node handover becomes efficient and unified.

An exemplary application of the blockchain network is described below by taking an example in which multiple supplier service entities access the blockchain network to implement management of logistics data.

Figure 1B:
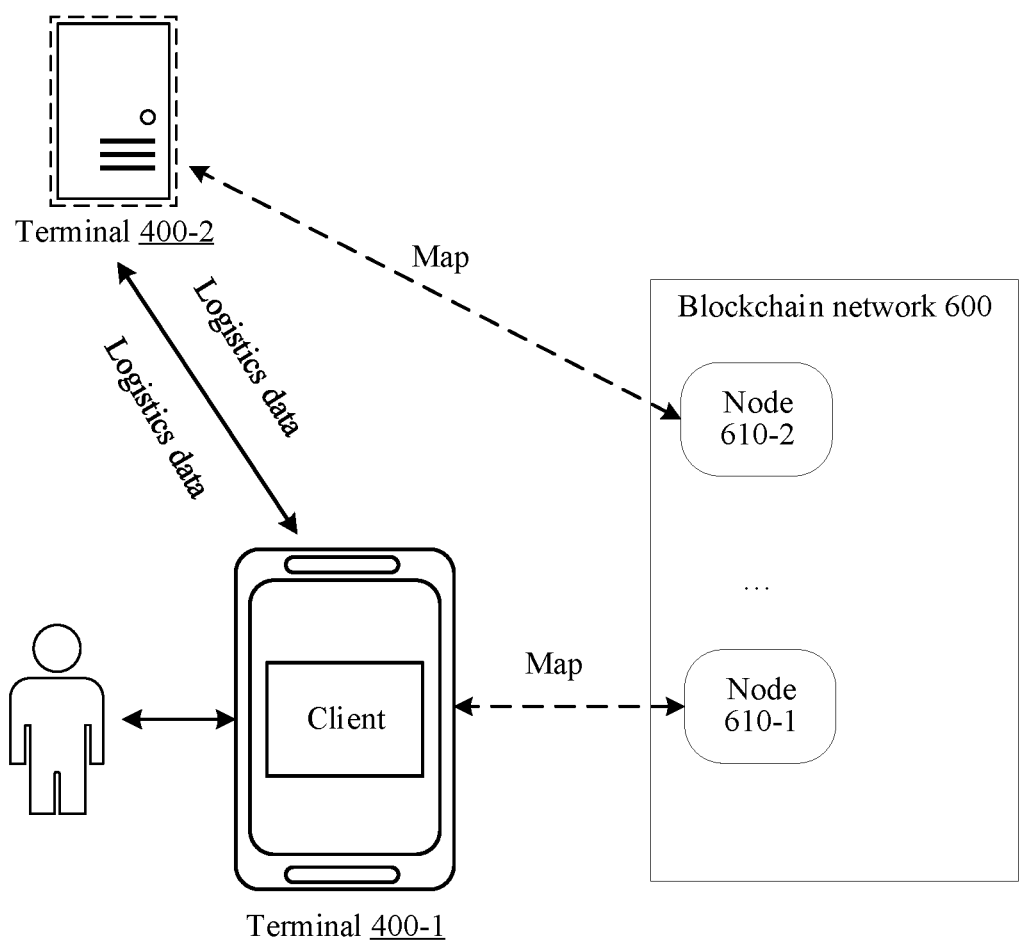
FIG. 1B is a schematic architecture diagram of a logistics system based on a blockchain network provided according to an embodiment of the present disclosure.

In some embodiments, FIG. 1B is a schematic architecture diagram of a logistics system based on a blockchain network provided by according to an embodiment of the present disclosure. An exemplary application of the blockchain network according to the embodiments of the present disclosure is described below. Referring to FIG. 1B, provided are a blockchain network 600 (exemplarily showing that the blockchain network 600 includes a node 610-1 and a node 610-2), a terminal 400-2 (corresponding to a supplier service entity B), and a terminal 400-1 (corresponding to a supplier service entity A), which are respectively described below.

Both the terminal 400-2 (mapped to the node 610-2) and the terminal 400-1 (mapped to the node 610-1) may join the blockchain network 600 and become nodes therein. FIG. 1B exemplarily shows that the terminal 400-1 is mapped to the node 610-1 in the blockchain network 600. Each node (such as the node 610-1 and the node 610-2) has a consensus function and an accounting (that is, maintaining a state database, such as a key value database) function.

The logistics data collected by the terminal 400-1 is recorded in the state database of each node (for example, the node 610-1), so that the terminal 400-1 and the terminal 400-2 may query the logistics data recorded in the state database.

The node 610-1 is the first master node, and the master node in the blockchain network is configured to package and propose the block to be added to the blockchain network. The node 610-2 may start the data processing of the block consensus service. First, the data processing of the proposal stage is performed. When the node 610-2 does not obtain, in the proposal stage, a block proposal message generated by the node 610-1 for a block 1 (the block 1 is a block to be placed on-chain, and logistics data 1 is stored in the block 1), it indicates that the supplier service entity A does not normally perform block packaging and proposal in the proposal stage, that is, the supplier service entity A does not normally perform on-chain storage of the logistics data, so that the supplier service entity B may initiate a master node handover mechanism. The node 610-2 may generate a node handover proposal message, the node handover proposal message being used for requesting master node handover of the node 610-1 in the proposal stage. The node 610-2 may broadcast the generated node handover proposal message to other consensus nodes in the blockchain network. Then, in the voting stage, when the node 610-2 obtains the number of node handover proposal messages obtained in the voting stage is not less than a target number, the node 610-2 may generate a node handover voting message, the node handover voting message being a message that requests master node handover of the node 610-1 in the voting stage. The node 610-2 may broadcast the generated node handover voting message to other consensus nodes in the blockchain network. Further, in the commit stage, when the node 610-2 obtains the node handover voting messages (including the message generated by itself and the messages broadcast by other consensus nodes) whose number is not less than a target number in the commit stage, the node 610-2 may select the node 610-2 for replacing the node 610-1 from the multiple consensus nodes included in the consensus network, and then the node 610-2 may be taken as a new master node. The node 610-2 subsequently controlled by the supplier service entity B is taken as the master node to package and propose the block to be added to the blockchain network.

Through the embodiments of the present disclosure, the master node handover judgment may be performed in the blockchain network in which the multiple supplier service entities participate, so that the master node handover becomes efficient and unified, and the supplier service entity without normal packaging and proposal is avoided from continuing to be the master node; and flexible and efficient handover to the nodes of other supplier service entities may be realized according to the foregoing mechanism, thereby improving real-time performance of on-chain storage of logistics data.

An exemplary application of the blockchain network is described below by taking an example in which multiple supplier service entities access the blockchain network to implement federated learning.

A user A, a user B, and a user C are conducting a federated learning task for an item recommendation model, and the user A, the user B, and the user C are all training parties. The user A has the first part of training data for the item recommendation model, the user B has the second part of training data for the item recommendation model, and the user C has the third part of training data for the item recommendation model. The first part of training data, the second part of training data, and the third part of training data constitute complete training data for training the item recommendation model. The node corresponding to the user A is the master node, and is responsible for packaging and proposing a block of training data. However, the nodes corresponding to other users do not obtain, in the proposal stage, the block proposal message for the block 1 generated by the node corresponding to user A, and then the data processing method provided according to the embodiments of the present disclosure starts to be implemented. The node corresponding to the user B is the master node, and the node corresponding to the user A is no longer the master node. Through the embodiments of the present disclosure, the master node handover judgment may be performed in the blockchain network in which multiple training parties participate, so that the master node handover becomes efficient and unified, and the training party without normal packaging and proposal is avoided from continuing to be the master node; and flexible and efficient handover to the nodes of other training parties may be realized according to the foregoing mechanism, thereby improving real-time performance of on-chain storage of training data.

Figure 3:
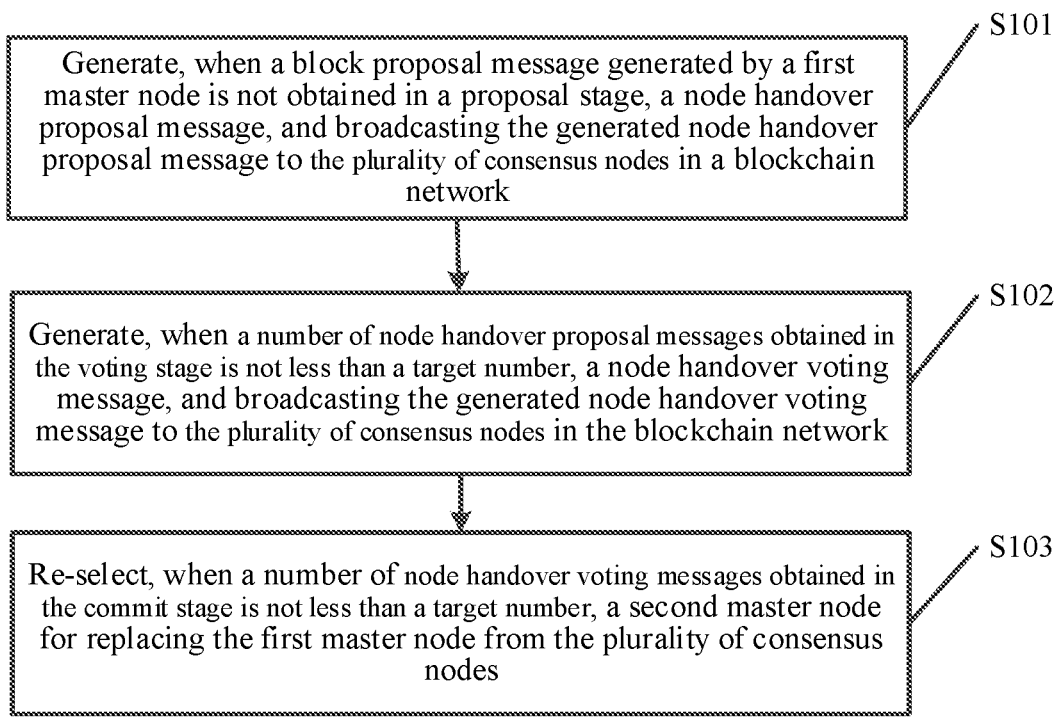
FIG. 3 is a schematic flowchart of a data processing method for a blockchain network provided according to an embodiment of the present disclosure.

FIG. 3 is a schematic flowchart diagram of a data processing method for a blockchain network provided according to an embodiment of the present disclosure. As shown in FIG. 3, the method may include:

step S101: Generate, when a block proposal message generated by a first master node is not obtained in the proposal stage, a node handover proposal message, and broadcast the generated node handover proposal message to the plurality of consensus nodes in the blockchain network; the first master node being any one of the plurality of consensus nodes, and the first master node being configured to package and propose a block to be added to the blockchain network.

As an example, the blockchain network includes multiple consensus nodes, each consensus node includes at least one computer device, and the specific number of the multiple consensus nodes is determined according to an actual application scenario, which is not limited. Therefore, an execution subject in the embodiments of the present disclosure may be any consensus node in the blockchain network. In other words, each consensus node in the blockchain network may execute the data processing method for the blockchain network provided in the embodiments of the present disclosure. A consensus node may be composed of one or more computer devices, which may be terminal devices or servers. The execution subject in the embodiments of the present disclosure is collectively referred to as the consensus node below.

Multiple consensus nodes in the blockchain network may include the first master node, the first master node may be the master node currently acting as a block-producing node in the blockchain network, and the first master node is configured to package and propose a block to be added to the blockchain network.

As an example, the blockchain network supports data processing of a block consensus service, the block consensus service is a service of consensus on the block, and the block consensus service may include three stages: a proposal stage, a voting stage, and the commit stage. The proposal stage is a stage of proposing a new pending block to be added, the voting stage is a stage of voting the pending block to be added to determine whether to add the pending block, and the commit stage is a stage of chaining the block (such as when the voting on adding of the block is successful in the voting stage) or canceling the chaining (such as when the voting on adding of the block fails in the voting stage). Chain a block, or chaining a block, as used herein, may refer to the process of add the block in the blockchain network, in other words, also called an on-chain process of the block. Once the process is completed, the block may become a permanent record on the blockchain and is shared and verified by all nodes in the network.

When the first master node detects that a block to be added needs to be packaged and agreed, the first master node may generate a block proposal message, and the block proposal message may be a message that consents to propose the block to be added, or a message that does not consent to propose the block to be added.

Therefore, when the consensus node does not obtain, in the proposal stage, the block proposal message generated by the first master node, it indicates that the first master node delays block production, and handover of the first master node may be requested.

Specifically, when the consensus node does not obtain, in the proposal stage, the block proposal message generated by the first master node, the consensus node may generate a node handover proposal message, the node handover proposal message being used for requesting master node handover of the first master node in the proposal stage. The request for the master node handover is a request for re-selecting a master node. The consensus node may broadcast the node handover proposal message generated by itself to other consensus nodes in the blockchain network.

As an example, the specific process in which the consensus node generates the node handover proposal message may be: when the consensus node does not obtain, in the proposal stage, the block proposal message generated by the first master node, the consensus node may obtain a proposal blank ballot identifier, which may be arbitrarily set to indicate that the master node needs to be handed over in the proposal stage, for example, the proposal blank ballot identifier may be a character or a string of characters, or the proposal blank ballot identifier may be a number or symbol, etc. The proposal blank ballot identifier may be set according to an actual application scenario, which is not limited. The proposal blank ballot identifier may indicate that the master node needs to be handed over in the proposal stage, thereby accurately controlling a handover occasion in the proposal stage.

As an example, the consensus node may generate a node handover proposal message through the obtained proposal blank ballot identifier, and the generated node handover proposal message includes the proposal blank ballot identifier. The generated node handover proposal message needs to be broadcast to other consensus nodes, and therefore, during setting of the proposal blank ballot identifier, the proposal blank ballot identifier may be set to be fewer characters, so as to reduce the data traffic during broadcasting of the node handover proposal message.

As an example, when the consensus node obtains, in the proposal stage, the block proposal message generated by the first master node and agrees on the block proposal message (when a consensus on the block proposal message is reached, it indicates that the proposed block is agreed to be added in the proposal stage), the consensus node may generate a proposal agreement message and broadcast the generated proposal agreement message to other consensus nodes in the blockchain network. By broadcasting the proposal agreement message, all consensus nodes may be notified quickly in the proposal stage to ensure information synchronization.

As an example, when the consensus node obtains, in the proposal stage, the block proposal message generated by the first master node and does not agree on the block proposal message (when a consensus on the block proposal message is not reached, it indicates that the proposed block is not agreed to be added in the proposal stage), the consensus node may generate a proposal disagreement message and broadcasts the generated proposal disagreement message to other consensus nodes in the blockchain network.

In the proposal stage, the consensus node may generate any one of the node handover proposal message, the proposal agreement message or the proposal disagreement message, and these three messages (including the node handover proposal message, the proposal agreement message, and the proposal disagreement message) all belong to different types of proposal messages. In fact, each consensus node may generate any one of the node handover proposal message, the proposal agreement message or the proposal disagreement message in the proposal stage, and the consensus nodes may broadcast the proposal messages generated by themselves to each other.

Step S102: Generate, when a number of node handover proposal messages obtained in the voting stage is not less than a target number, a node handover voting message, and broadcast the generated node handover voting message to the plurality of consensus nodes in the blockchain network;

As an example, the voting stage is a next stage of the proposal stage. The algorithm for block consensus in the blockchain network may be a Byzantine algorithm, the blockchain network may include 3f consensus nodes, where f is a positive integer, and the target number may be equal to 2f+1. When the consensus node obtains, in the voting stage, a number of the node handover proposal messages that is not less than the target number, the consensus node may generate a message indicating that most of the consensus nodes agree on handover of the first master node in the proposal stage. Therefore, the consensus node may generate a node handover voting message, which is used for requesting the master node handover of the first master node in the voting stage. The node handover proposal messages obtained by the consensus node may include a node handover proposal message generated by itself and node handover proposal messages broadcast by other consensus nodes.

After the consensus node generates the node handover voting message, the consensus node may broadcast the node handover voting message generated by itself to other consensus nodes in the blockchain network.

As an example, the specific process in which the consensus node generates the node handover voting message may be: when the consensus node obtains the number of node handover proposal messages obtained in the voting stage is not less than the target number, the consensus node may obtain a voting blank ballot identifier, which may be arbitrarily set to indicate that the master node needs to be handed over in the voting stage, for example, the voting blank ballot identifier may be a character or a string of characters, or the voting blank ballot identifier may be a number or symbol, etc. The voting blank ballot identifier may be set according to an actual application scenario, which is not limited. The voting blank ballot identifier may indicate that the master node needs to be handed over in the voting stage, thereby accurately controlling a handover occasion in the voting stage.

As an example, when the consensus node obtains the proposal agreement messages (including the message generated by itself and messages broadcast by other consensus nodes) whose number is not less than a target number in the voting stage, it indicates that most of the consensus nodes consent to chain the block to be added currently in the voting stage, and the consensus node may generate a voting agreement message which may be used for indicating that the block to be added currently is agreed to be added in the voting stage.

As an example, when the consensus node, in the voting stage, obtains the proposal agreement messages whose number is less than the target number, and obtains the node handover proposal messages whose number is less than the target number, the consensus node may also generate the node handover voting message. When a number of proposal disagreement messages obtained is not less than the target number, it indicates that the current first master node proposes an unreliable block to be added. In this case, the consensus node may also generate a node handover voting message for requesting master node handover of the current first master node.

As an example, when in the voting stage, the consensus node obtains the proposal agreement messages whose number is less than the target number, and obtains the node handover proposal messages whose number is less than the target number, the consensus node may initiate a timeout waiting mechanism, and after initiating the timeout waiting mechanism, may wait for a target time period in the voting stage. The specific length of the target time period may be determined according to an actual application scenario, which is not limited. The starting time of the target time period may be the time when the timeout waiting mechanism is initiated. Initiating the timeout waiting mechanism in the voting stage is equivalent to extending the time of the voting stage. When the consensus node, at the time that the target time period is ended after the timeout waiting mechanism is initiated (i.e., within the whole period of the voting stage, that is, the total of the original time period and the extended time period), still fails to obtain the target number of the proposal agreement messages, and fails to obtain the target number of the node handover proposal messages, the consensus node may also generate the node handover proposal message. Similarly, if the consensus node has obtained, at the time that the target time period is ended after the timeout waiting mechanism is initiated, the proposal agreement messages whose number is not less than the target number, the consensus node may generate a voting agreement message. When the consensus node obtains, at the time that the target time period ends after the timeout waiting mechanism is initiated, the node handover proposal messages whose number is not less than the target number, the consensus node may also generate the node handover voting message. The timeout waiting mechanism may effectively control a generation occasion of the node handover voting message and ensures that node handover conforms to the willingness of most nodes.

In the voting stage, the consensus node may generate any one of the node handover voting message or the voting agreement message, and both the node handover voting message and the voting agreement message belong to voting messages in the voting stage. The consensus node may broadcast the voting message generated by itself to other consensus nodes. By broadcasting the voting message, all consensus nodes may be notified quickly in the voting stage to ensure information synchronization.

Step S103: Re-select, when a number of node handover voting messages obtained in the commit stage is not less than a target number, a second master node for replacing the first master node from the plurality of consensus nodes.

As an example, the commit stage is a next stage of the voting stage. The block proposal message may be a proposal message for a target block, that is, the block proposal message is used for requesting reaching a consensus on the target block to add the target block to the blockchain network.

When the consensus node obtains, in the commit stage, the node handover voting messages whose number is not less than the target number, it indicates that most of the consensus nodes agree on handover of the first master node in the voting stage. The consensus node may re-select a second master node for replacing the first master node from multiple consensus nodes. That is, the first master node is replaced and the second master node is taken as a new block-producing node in the blockchain network, that is, a new master node. In this case, the consensus node may freeze the current target block and do not chain the target block.

As an example, when the consensus node obtains, in the commit stage, the voting agreement messages whose number is not less than the target number, the consensus node may chain the target block, for example, the target block is added to the blockchain network. In this case, it indicates that it is unnecessary to hand over the first master node, and the first master node is normal.

As an example, when the consensus node obtains, in the commit stage, the node handover voting messages whose number is less than the target number, and the voting agreement messages whose number is less than the target number, the consensus node may also freeze the target block and do not chain the target blocks. At the same time, the consensus node may re-select a second master node for replacing the first master node from multiple consensus nodes in the blockchain network.

As an example, after the first master node is replaced with the second master node, the first master node is no longer the master node in the blockchain network, but the first master node may continue to participate in the process of reaching a consensus on the block to be added to the blockchain network. Moreover, after the target block is frozen, that is, after the first master node is replaced with the second master node, when the first master node is subsequently re-selected as the master node in the blockchain network, the first master node may add its own new block at a block height corresponding to the frozen target block in the blockchain network.

Figure 4:
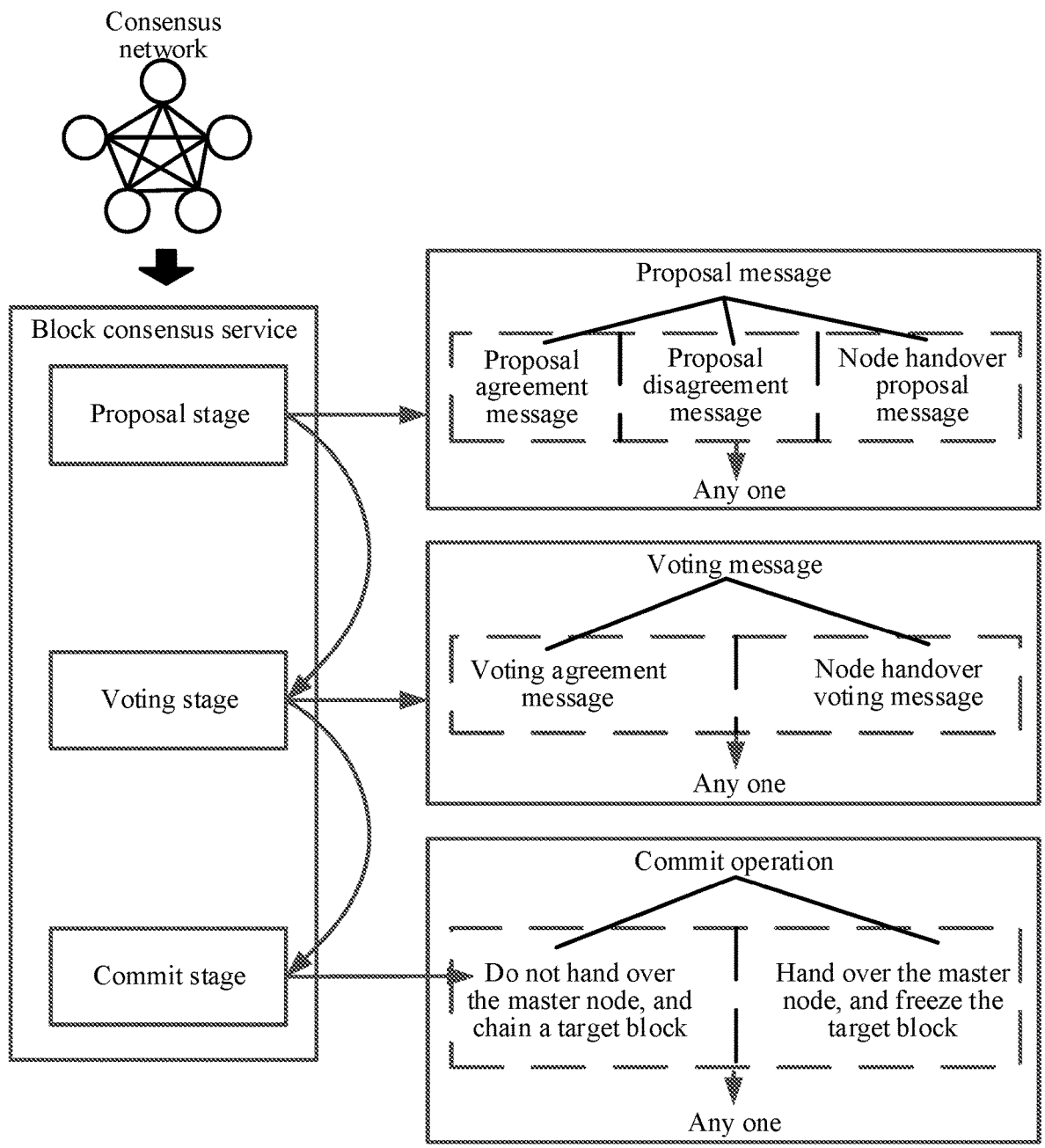
FIG. 4 is a schematic diagram of a scenario of implementing a block consensus service provided according to an embodiment of the present disclosure.

FIG. 4 is a schematic diagram of a scenario of executing a block consensus service provided according to an embodiment of the present disclosure. As shown in FIG. 4, the blockchain network includes a consensus network, which is composed of multiple consensus nodes in the blockchain network. Each consensus node in the consensus network may execute a block consensus service, which may include a proposal stage, a voting stage, and a commit stage. In the proposal stage, the consensus node may generate any one of a proposal agreement message (when a consensus on the block proposal message is reached), a proposal disagreement message (when a consensus on the block proposal message is not reached), and a node handover proposal message (when the block proposal message is not obtained in the proposal stage), and broadcast the proposal message generated by itself to other consensus nodes in the consensus network.

In the voting stage, the consensus node may generate any one of the voting agreement message (when the proposal agreement messages whose number is not less than the target number are obtained) and the node handover voting message (when the node handover proposal messages whose number is not less than the target number are obtained), and may broadcast the voting agreement message or node handover voting message generated by itself to other consensus nodes in the consensus network.

In the commit stage, when the consensus node obtains voting agreement messages whose number is not less than the target number, the consensus node may not hand over the first master node, and may chain the target block corresponding to the block proposal message. On the contrary, when the consensus node obtains the node handover voting messages whose number is not less than the target number, the consensus node may hand over the first master node, such as hand overing the first master node to the second master node and freezing the target block.

Figure 5:
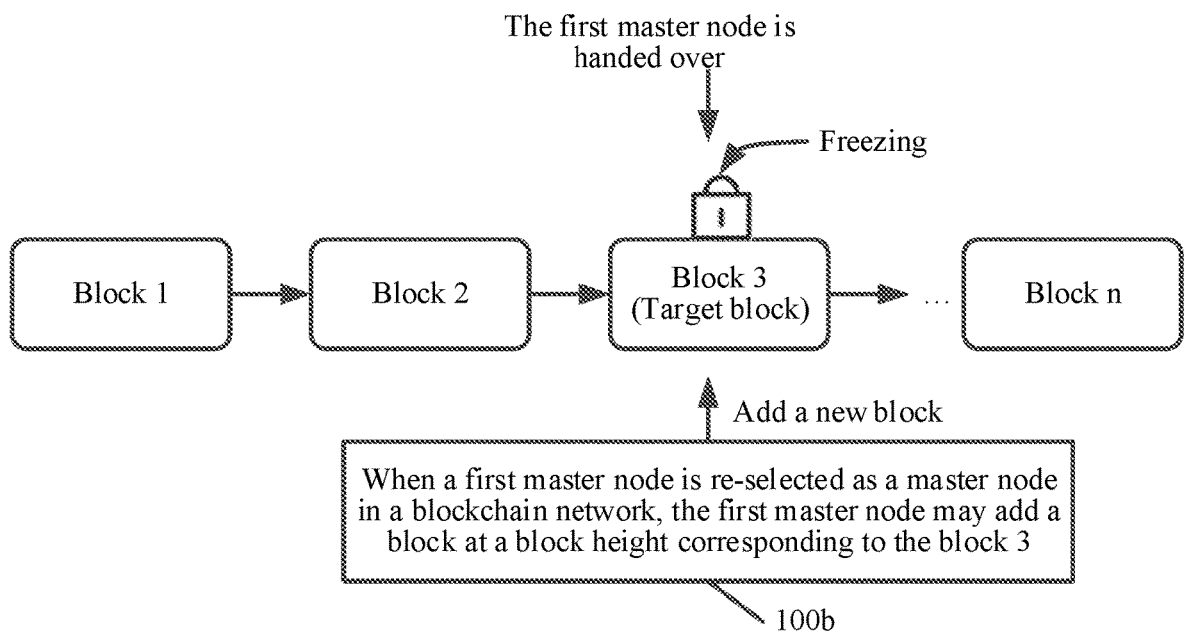
FIG. 5 is a schematic diagram of a scenario of block processing provided according to an embodiment of the present disclosure.

FIG. 5 is a schematic diagram of a scenario of block processing provided according to an embodiment of the present disclosure. As shown in FIG. 5, the blockchain network may store a total of n blocks including a block 1, a block 2, a block 3, . . . , and block n, where n is a positive integer. The block 3 may be the target block corresponding to the block proposal message.

When the first master node is handed over to the second master node, the block 3 corresponding to the block proposal message may be frozen. After the block 3 is frozen, no block may be added at a block height corresponding to the block 3. That is, freezing the block 3 may be understood as freezing the block height corresponding to the block 3. When the first master node is subsequent re-selected as the master node in the blockchain network, the first master node may add a block (such as a block 100b) at the block height corresponding to the block 3 in the blockchain network.

As an example, a plurality of consensus nodes in the blockchain network may have a polling order, which may be an order of sequentially selecting the master node. Therefore, the consensus node may, according to the polling order of the plurality of consensus nodes, use a consensus node adjacent to the first master node in the plurality of consensus nodes and following the first master node as the second master node for replacing the first master node. For example, there are three consensus nodes in the blockchain network, which are specifically a consensus node 1, a consensus node 2, and a consensus node 3. The polling order of the three consensus nodes is sequentially the consensus node 1, the consensus node 2, and the consensus node 3. When the first master node is the consensus node 2, the next consensus node adjacent to the consensus node 2, namely the consensus node 3, may be taken as the second master node. The second master node may be clearly obtained through the polling order, thereby avoiding confusion in the selection of the master node.

Figure 6:
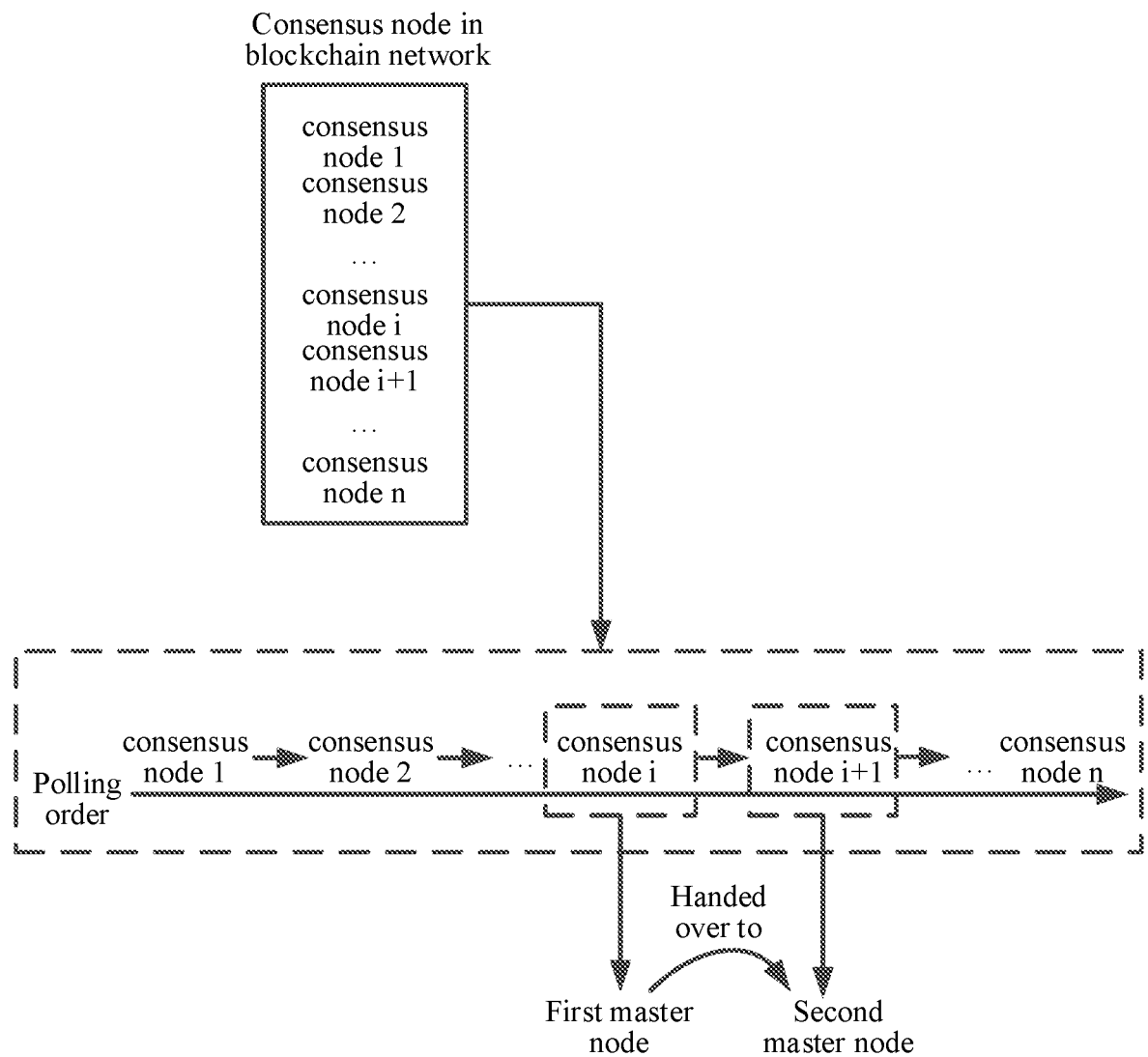
FIG. 6 is a schematic diagram of a scenario of selecting a master node provided according to an embodiment of the present disclosure.

FIG. 6 is a schematic diagram of a scenario of selecting a master node provided according to an embodiment of the present disclosure. As shown in FIG. 6, the blockchain network may include n consensus nodes, which specifically include a consensus node 1, a consensus node 2, . . . , a consensus node i, a consensus node i+1, . . . , and a consensus node n. The polling order of the n consensus nodes is also sequentially the consensus node 1, the consensus node 2, . . . , the consensus node i, the consensus node i+1, . . . , and the consensus node n, where i is a positive integer less than or equal to n. Therefore, when the first master node is the consensus node i, then the second master node may be the next consensus node i+1 adjacent to the consensus node i.

The selected second master node may directly package and propose a block according to the normal process.

According to the data processing method for the blockchain network provided in the embodiments of the present disclosure, the master node handover process and the block consensus process are merged into one process, that is, the master node handover process includes the block consensus process (that is, the processing process of the block consensus service), without an additional process to implement the master node handover. The overall process is efficient, unified and accurate, and it is ensured that honest nodes in multiple consensus nodes are consistent. Moreover, in this process, when the master node needs to be handed over, only the node handover message (the node handover proposal message and the node handover voting message as stated above) with a blank ballot identifier (the voting blank ballot identifier and the proposal blank ballot identifier as stated above) needs to be broadcast, thereby ensuring low communication traffic, reducing the occupation of network bandwidth, improving the communication efficiency, also improving the master node handover efficiency, and further reducing the complexity of master node handover.

Figure 7:
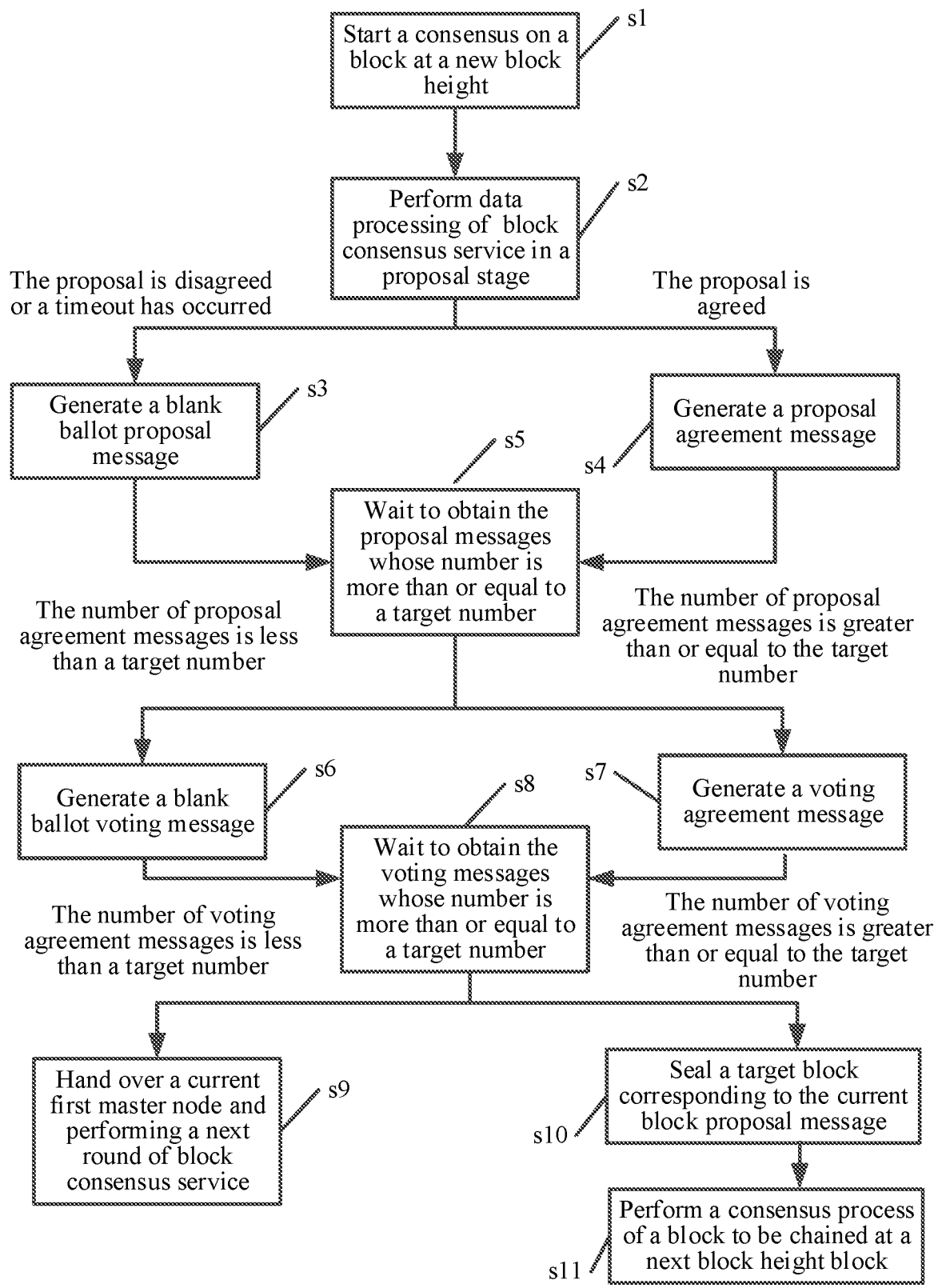
FIG. 7 is a schematic flowchart diagram of executing a block consensus service provided according to an embodiment of the present disclosure.

FIG. 7 is a schematic flowchart diagram of executing a block consensus service provided according to an embodiment of the present disclosure. As shown in FIG. 7, s1, a consensus is started on a block at a new block height, and specifically, a consensus on the block at the new block height is to start data processing of a new round of block consensus service; s2, first of all, data processing in the proposal stage of the block consensus service is performed; s3, when the consensus node does not agree on the proposal (for example, a consensus on the block proposal message is not reached) or a timeout has occurred (for example, the block proposal message is not obtained within the data processing duration of the proposal stage), the consensus node may generate a blank ballot proposal message (that is, the node handover proposal message); s4, when the consensus node agrees on the proposal, the consensus node may generate a proposal agreement message; s5, the consensus node may wait to obtain proposal messages (including the proposal message generated by itself and the proposal messages broadcast by other consensus nodes) whose number is more than or equal to a target number; s6, when the consensus node obtains the proposal agreement message whose number is less than the target number, the consensus node may generate a blank ballot voting message; s7, when the consensus node obtains the proposal agreement messages whose number is not less than the target number, the consensus node may generate a voting agreement message; s8, the consensus node may wait to obtain voting messages (including the proposal message generated by itself and the voting messages broadcast by other consensus nodes) whose number is more than or equal to the target number; s9, when the consensus node obtains voting agreement messages whose number is less than the target number, the consensus node may hand over the current first master node, for example, handing over the current first master node to the second master node, and may execute a next round of block consensus service; s10, when the consensus node obtains the voting agreement messages whose number is not less than the target number, the consensus node may seal/package a target block corresponding to the current block proposal message; and s11, after the target block is sealed, the consensus node may execute a consensus process of the target block at a next block height.

It can be seen from the forgoing process that in the embodiments of the present disclosure, if the master node handover process is required to be executed in each stage (such as the proposal stage and the voting stage), it is only necessary to generate a message (such as the node handover proposal message and the node handover voting message) with a corresponding blank ballot identifier (such as the proposal blank ballot identifier and the voting blank ballot identifier) in the process of executing the block consensus service to replace the corresponding consensus message and broadcast same to each other, without an additional master node handover request process. The integration of the block consensus process and the master node handover judgment process is implemented, and the master node handover judgment process is efficient and unified.

In the embodiments of the present disclosure, when the block proposal message generated by the first master node is not obtained in the proposal stage, a node handover proposal message is generated and the generated node handover proposal message is broadcast to the plurality of consensus nodes in the blockchain network. The first master node is one of the plurality of consensus nodes, and the first master node is configured to package and propose a block to be added to the blockchain network. When a number of node handover proposal messages obtained in the voting stage is not less than a target number, then a node handover voting message is generated and the generated node handover voting message is broadcast to each consensus node in the blockchain network. When the node handover voting messages whose number is not less than a target number are obtained in the commit stage, then a second master node for replacing the first master node is re-selected from the plurality of consensus nodes. Hence, the method provided in the embodiments of the present disclosure may add the master node handover judgment process in the process of executing the block consensus service, without employing an additional process to generate an additional master node request to implement handover judgment of the master node. Therefore, the master node handover process is efficient, simplified and unified.

Figure 8:
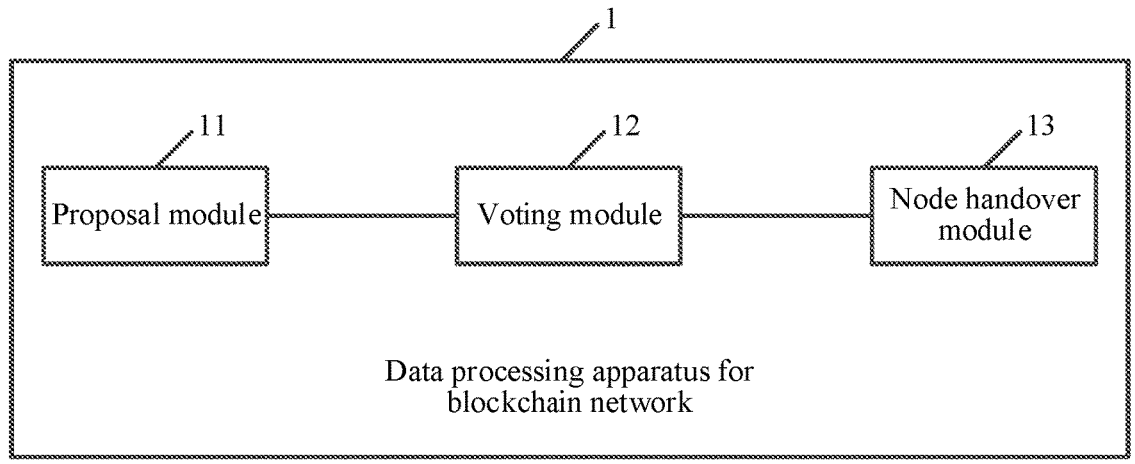
FIG. 8 is a schematic structural diagram of a data processing apparatus for a blockchain network provided according to an embodiment of the present disclosure.

FIG. 8 is a schematic structural diagram of a data processing apparatus for a blockchain network provided according to an embodiment of the present disclosure. The data processing apparatus for the blockchain network may be a computer program (including a program code) running in the computer device, for example, the data processing device for the blockchain network is an application software, and the data processing apparatus for the blockchain network may be configured to execute the corresponding steps in the method provided by the embodiments of the present disclosure. The blockchain network supports data processing of a block consensus service, the block consensus service includes a proposal stage, a voting stage, and a commit stage, the blockchain network includes a plurality of consensus nodes, and the apparatus is applied to any consensus node among a plurality of consensus nodes. As shown in FIG. 8, a data processing apparatus 1 for the blockchain network may include: a proposal module 11, a voting module 12, and a node handover module 13.

The proposal module 11 is configured to generate a node handover proposal message when a block proposal message generated by a first master node is not obtained in the proposal stage, and broadcast the generated node handover proposal message to the plurality of consensus nodes in the blockchain network. The first master node is any one of the plurality of consensus nodes, and the first master node is configured to package and propose a block to be added to the blockchain network.

The voting module 12 is configured to generate, when a number of node handover proposal messages obtained in the voting stage is not less than a target number, a node handover voting message, and broadcast the generated node handover voting message to the plurality of consensus nodes in the blockchain network.

The node handover module 13 is configured to re-select, when the node handover voting messages whose number is not less than a target number are obtained in the commit stage, a second master node for replacing the first master node from the plurality of consensus nodes.

In some embodiments, the proposal module 11 is further configured to: obtain, when the block proposal message generated by the first master node is not obtained in the proposal stage, a proposal blank ballot identifier; and generate a node handover proposal message according to the proposal blank ballot identifier.

In some embodiments, the voting module 12 is further configured to: obtain, when the number of the node handover proposal messages obtained in the voting stage is not less than the target number, a voting blank ballot identifier; and generate, a node handover voting message according to the voting blank ballot identifier.

In some embodiments, the generated node handover proposal message is used for requesting master node handover of the first master node in the proposal stage. The generated node handover voting message is used for requesting master node handover of the first master node in the voting stage.

In some embodiments, the apparatus 1 is further configured to: generate, when the block proposal message for a target block sent by the first master node is received in the proposal stage and a consensus on the block proposal message is reached, a proposal agreement message, and broadcast the generated proposal agreement message to the plurality of consensus nodes in the blockchain network.

In some embodiments, the apparatus 1 is further configured to: generate, when the proposal agreement messages whose number is not less than the target number are obtained in the voting stage, a voting agreement message, and broadcast the generated voting agreement message to the plurality of consensus nodes in the blockchain network.

In some embodiments, the apparatus 1 is further configured to: chain, when the voting agreement messages whose number is not less than the target number are obtained in the commit stage, a target block in the blockchain network.

In some embodiments, the apparatus 1 is further configured to: generate, when the number of the node handover proposal messages obtained in the voting stage is less than the target number and the number of the proposal agreement messages obtained in the voting stage is less than the target number, a node handover voting message, and broadcast the generated node handover voting message to the plurality of consensus nodes in the blockchain network.

In some embodiments, the apparatus 1 is further configured to: initiate, when the number of the node handover proposal messages obtained in the voting stage is less than the target number and the number of the proposal agreement messages is less than the target number, a timeout waiting mechanism; and generate, in response to that the number of the obtained node handover voting messages is less than the target number and the obtained proposal agreement messages is less than the target number when a target time period ends after initiating the timeout waiting mechanism, a node handover voting message.

In some embodiments, the apparatus 1 is further configured to: re-select, when a number of the node handover voting messages obtained in the commit stage is less than the target number and a number of the voting agreement messages is less than the target number, a second master node for replacing a first master node from the plurality of consensus nodes.

In some embodiments, the apparatus 1 is further configured to: initiate, when a number of the node handover voting messages obtained in the commit stage is less than the target number and a number of the voting agreement messages is less than the target number, a timeout waiting mechanism; and select, in response to that the number of the obtained node handover voting messages is less than the target number and the number of the obtained voting agreement messages is less than the target number when a target time period ends after initiating the timeout waiting mechanism, the second master node for replacing the first master node from the plurality of consensus nodes.

In some embodiments, the block proposal message is a message for a target block. The apparatus 1 is further configured to: freeze, when the node handover voting messages whose number is not less than the target number are obtained in the commit stage, a target block in the blockchain network. When the first master node is re-selected as a master node in the blockchain network, the first master node is configured to add a block at a block height corresponding to the target block in the blockchain network.

In some embodiments, the plurality of consensus nodes have a polling order. The node handover module 13 is further configured to: determine, according to the polling order, a consensus node adjacent to the first master node in the plurality of consensus nodes and following the first master node as the second master node.

In some embodiments, the steps involved in the data processing method for the blockchain network shown in FIG. 3 may be executed by various modules in the data processing apparatus 1 for the blockchain network shown in FIG. 8. For example, step S101 shown in FIG. 3 may be executed by the proposal module 11 in FIG. 8, and step S102 shown in FIG. 3 may be executed by the voting module 12 in FIG. 8. Step S103 shown in FIG. 3 may be executed by the node handover module 13 in FIG. 8.

In the embodiments of the present disclosure, when the block proposal message generated by the first master node is not obtained in the proposal stage, a node handover proposal message is generated and the generated node handover proposal message is broadcast to the plurality of consensus nodes in the blockchain network. The first master node is any one of the plurality of consensus nodes, and the first master node is configured to package and propose a block to be added to the blockchain network. When a number of node handover proposal messages obtained in the voting stage is not less than a target number, then a node handover voting message is generated and the generated node handover voting message is broadcast to each consensus node in the blockchain network. When the node handover voting messages whose number is not less than a target number are obtained in the commit stage, then a second master node for replacing the first master node is re-selected from the plurality of consensus nodes. Hence, the apparatus provided in the embodiments of the present disclosure may add the master node handover judgment process in the process of executing the block consensus service, without employing an additional process to generate an additional master node request to implement handover judgment of the master node. Therefore, the master node handover process is efficient, simplified and unified.

In some embodiments, the modules in the data processing apparatus 1 for the blockchain network shown in FIG. 8 may be combined into one or more units respectively or completely, or one or more of the units may be further divided into smaller functional sub-units to implement the same operation without affecting the implementation of the technical effect of the embodiments of the present disclosure. The foregoing modules are divided based on logical functions. In practical applications, the functions of a module may also be implemented by multiple units, or the functions of multiple modules may be implemented by one unit. In other embodiments of the present disclosure, the data processing apparatus 1 for the blockchain network may also include other units. In practical applications, these functions may also be assisted by other units, and may be implemented by multiple units.

In some embodiments, the data processing apparatus 1 for the blockchain network as shown in FIG. 8 may be constructed by running a computer program (including a program code) capable of executing the steps involved in the corresponding method as shown in FIG. 3 on a general-purpose computer device, such as a computer, which includes processing elements and storage elements such as a central processing unit (CPU), a random access storage medium (RAM), and a read-only storage medium (ROM), and the data processing method for the blockchain network in the embodiments of the present disclosure is implemented. The computer program may be recorded, for example, on a computer-readable recording medium, and loaded into the computing device through the computer-readable recording medium, and runs therein.

Figure 9:
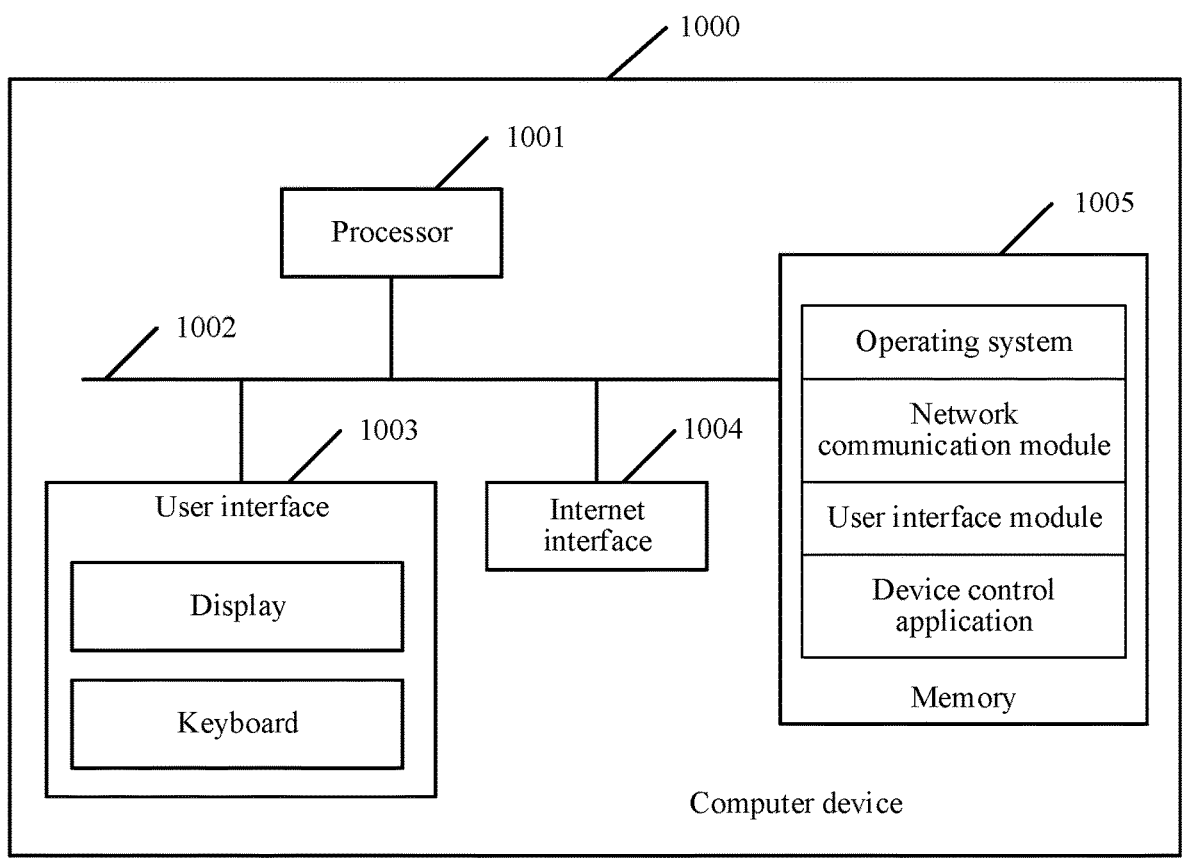
FIG. 9 is a schematic structural diagram of a computer device provided according to an embodiment of the present disclosure.

FIG. 9 is a schematic structural diagram of a computer device according to an embodiment of the present disclosure. As shown in FIG. 9, a computer device 1000 may include: a processor 1001, a network interface 1004, and a memory 1005. In addition, the computer device 1000 may also include a user interface 1003 and at least one communication bus 1002. The communication bus 1002 is configured to implement the connection communication between these components. The user interface 1003 may include a display and a keyboard, and the user interface 1003 may also include a standard wired interface and a standard wireless interface. The network interface 1004 may include a standard wired interface and a standard wireless interface (such as a Wi-Fi interface). The memory 1005 may be a high-speed RAM memory or a non-volatile memory, such as at least one disk memory. The memory 1005 may also be at least one storage apparatus distant from the processor 1001. As shown in FIG. 9, the memory 1005 as a computer storage medium may include an operating system, a network communication module, a user interface module, and a device control application program.

In the computer device 1000 shown in FIG. 9, the network interface 1004 may provide a network communication function. The user interface 1003 is mainly configured to provide an input interface for users. The processor 1001 may be configured to call a device control application stored in the memory 1005 to implement the following schemes: generating, when a block proposal message generated by a first master node is not obtained in the proposal stage, a node handover proposal message, and broadcasting the generated node handover proposal message to each consensus node in the blockchain network; the first master node being any one of the plurality of consensus nodes, and the first master node being configured to package and propose a block to be added to the blockchain network; generating, when a number of node handover proposal messages obtained in the voting stage is not less than a target number, a node handover voting message, and broadcasting the generated node handover voting message to each consensus node in the blockchain network; and re-selecting, when the node handover voting messages whose number is not less than a target number are obtained in the commit stage, a second master node for replacing the first master node from the plurality of consensus nodes.

In some embodiments, the processor 1001 may be configured to call the device control application stored in the memory 1005 to implement the following schemes: obtaining, when the block proposal message generated by the first master node is not obtained in the proposal stage, a proposal blank ballot identifier; and generating a node handover proposal message according to the proposal blank ballot identifier.

In some embodiments, the processor 1001 may be configured to call the device control application stored in the memory 1005 to implement the following schemes: obtaining, when the number of node handover proposal messages obtained in the voting stage is not less than the target number, a voting blank ballot identifier; and generating a node handover voting message according to the voting blank ballot identifier.

In some embodiments, the generated node handover proposal message is used for requesting master node handover of the first master node in the proposal stage. The generated node handover voting message is used for requesting master node handover of the first master node in the voting stage.

In some embodiments, the processor 1001 may be configured to call the device control application stored in the memory 1005 to implement the following scheme: generating, when the block proposal message for a target block sent by the first master node is received in the proposal stage and a consensus on the block proposal message is reached, a proposal agreement message, and broadcasting the generated proposal agreement message to each consensus node in the blockchain network.

In some embodiments, the processor 1001 may be configured to call the device control application stored in the memory 1005 to implement the following scheme: generating, when the proposal agreement messages whose number is not less than the target number are obtained in the voting stage, a voting agreement message, and broadcasting the generated voting agreement message to each consensus node in the blockchain network.

In some embodiments, the processor 1001 may be configured to call the device control application stored in the memory 1005 to implement the following scheme: chaining, when the voting agreement messages whose number is not less than the target number are obtained in the commit stage, a target block in the blockchain network.

In some embodiments, the processor 1001 may be configured to call the device control application stored in the memory 1005 to implement the following scheme: generating, when the number of the node handover proposal messages obtained in the voting stage is less than the target number and a number of the proposal agreement messages is less than the target number, a node handover voting message, and broadcasting the generated node handover voting message to the plurality of consensus nodes in the blockchain network.

In some embodiments, the processor 1001 may be configured to call the device control application stored in the memory 1005 to implement the following schemes: initiating, when the number of the node handover proposal messages obtained in the voting stage is less than the target number and the proposal agreement messages is less than the target number, a timeout waiting mechanism; and generating, in response to that the number of the obtained node handover voting messages is less than the target number and the obtained proposal agreement messages is less than the target number when a target time period ends after initiating the timeout waiting mechanism, a node handover voting message.

In some embodiments, the processor 1001 may be configured to call the device control application stored in the memory 1005 to implement the following scheme: re-selecting, when a number of the node handover voting messages obtained in the commit stage is less than the target number and a number of the voting agreement messages is less than the target number, a second master node for replacing the first master node from the plurality of consensus nodes.

In some embodiments, the processor 1001 may be configured to call the device control application stored in the memory 1005 to implement the following schemes: initiating, when a number of the node handover voting messages obtained in the commit stage is less than the target number and a number of the voting agreement messages is less than the target number, a timeout waiting mechanism; and selecting, in response to that the number of the obtained node handover voting messages is less than the target number and the number of the obtained voting agreement messages is less than the target number when a target time period ends after initiating the timeout waiting mechanism, a second master node for replacing the first master node from the plurality of consensus nodes.

In some embodiments, the processor 1001 may be configured to call the device control application stored in the memory 1005 to implement the following scheme: freezing, when the node handover voting messages whose number is not less than the target number are obtained in the commit stage, a target block in the blockchain network. When the first master node is re-selected as a master node in the blockchain network, the first master node is configured to add a block at a block height corresponding to the target block in the blockchain network.

In some embodiments, the multiple consensus nodes have a polling order, and the processor 1001 may be configured to call the device control application stored in the memory 1005 to implement the following scheme: determining, according to the polling order, a consensus node adjacent to the first master node in the plurality of consensus nodes and following the first master node as the second master node.

It is to be understood that the computer device 1000 described in the embodiments of the present disclosure may execute the description of the data processing method for the blockchain network in the embodiment corresponding to FIG. 3, and may also execute the description of the data processing apparatus 1 of the above blockchain network in the embodiment corresponding to FIG. 8, which will not be repeated here. In addition, the beneficial effects of using the same method are not repeated here again.

In addition, the embodiments of the present disclosure further provide a computer-readable storage medium storing the computer program executed by the data processing apparatus 1 for the blockchain network mentioned above, the computer program includes a program instruction, and when the processor, when executing the program instruction, may implement the description of the data processing method for the blockchain network in the embodiment corresponding to FIG. 3. Therefore, the details will not be repeated here again. In addition, the beneficial effects of using the same method are not repeated here again. For the technical details which are not disclosed in the embodiment of the computer storage medium involved in the present disclosure, please refer to the description of the method embodiment of the present disclosure.

As an example, the foregoing program instruction may be executed on a single computer device, or on multiple computer devices in a location, or on multiple computer devices distributed at multiple locations and interconnected through a communication network. The multiple computer devices distributed at multiple locations and interconnected through the communication network may form a blockchain network.

The computer-readable storage medium may be the data processing apparatus for the blockchain network provided by any of the foregoing embodiments or an internal storage unit of the computer device, such as a hard disk or an internal memory of the computer device. The computer-readable storage medium may also be an external storage device of the computer device, such as a plug-in hard disk, a smart media card (SMC), a secure digital (SD) card, and a flash card equipped on the computer device. Further, the computer-readable storage medium may also include both the internal storage unit of the computer device and the external storage device. The computer-readable storage medium is configured to store the computer program and other programs and data required by the computer device. The computer-readable storage medium may also be configured to temporarily store data that has been outputted or will be outputted.

The embodiments of the present disclosure provide a computer program product or computer program, which includes a computer instruction stored in the computer-readable storage medium. The processor of the computer device reads the computer instruction from the computer-readable storage medium, and the processor executes the computer instruction to cause the computer device to execute the description of the data processing method for the blockchain network in the embodiment corresponding to FIG. 3. Therefore, the details will not be repeated here. In addition, the beneficial effects of using the same method are not repeated here again. For the technical details which are not disclosed in the embodiment of the computer-readable storage medium involved in the present disclosure, please refer to the description of the method embodiment of the present disclosure.

The terms "first", "second" and the like in the description, claims and drawings of the embodiments of the present disclosure are used to distinguish different objects, rather than describing a particular order. In addition, the term "including" as well as any variation thereof are intended to cover non-exclusive inclusion. For example, a process, method, apparatus, product or device including a series of steps or units is not limited to the listed steps or modules, but may further include steps or modules that are not listed, or may further include other steps and units inherent to the process, method, apparatus, product or device.

A person skilled in the art may understand that the units and algorithm steps of each example described in combination with the embodiments disclosed herein may be implemented by electronic hardware, computer software or a combination thereof. To clearly illustrate the interchangeability of hardware and software, the composition and steps of each example have been generally described in accordance with the functions in the foregoing description. Whether these functions are implemented in hardware or software depends on the specific application and design constraints of the technical solution. A person skilled in the art may use different methods to implement the described functions for each specific application, but such implementation may not be considered beyond the scope of the present disclosure.

The method and related apparatus provided by the embodiments of the present disclosure are described with reference to the method flowchart diagram and/or structural schematic diagram provided by the embodiments of the present disclosure. Specifically, each flowchart and/or block in the method flowchart diagram and/or structural schematic diagram and the combination of flowchart and/or block in the flowchart diagram and/or block diagram may be implemented by computer program instructions. These computer program instructions may be provided to a processor of a general-purpose computer, a special-purpose computer, an embedded processor or other programmable data processing devices to generate a machine, so that the instructions are executed by the processor of a computer or other programmable data processing devices to generate an apparatus for implementing the functions specified in one or more processes in the flowchart and/or in one or more blocks in the structural schematic diagram. These computer program instructions may also be stored in a computer-readable memory that may direct a computer or other programmable data processing devices to work in a particular manner, so that the instructions stored in the computer-readable memory produce a manufacturing product including an instruction apparatus, which implements the functions specified in one or more processes in the flowchart and/or in one or more blocks in the structural schematic diagram. These computer program instructions may also be loaded onto a computer or other programmable data processing devices, so that a series of operation steps are implemented on the computer or other programmable devices to generate computer-implemented processing, and thus the instructions executed on the computer or other programmable devices provide steps for implementing the functions specified in one or more processes in the flowchart and/or in one or more blocks in the structural schematic diagram.

The foregoing disclosure is only exemplary embodiments of the present disclosure, and the scope of the claims of the present disclosure cannot be limited thereto. Therefore, the equivalent changes made according to the claims of the present disclosure still fall within the scope of the present disclosure.

What is claimed is:

1. A data processing method for a blockchain network, the blockchain network supporting data processing for a block consensus service, the block consensus service comprising a proposal stage, a voting stage, and a commit stage, and the method comprising:
   generating, by a consensus node among a plurality of consensus nodes in the blockchain network, when a block proposal message generated by a first master node is not obtained in the proposal stage, a node handover proposal message, the consensus node comprising at least one computer device;
   broadcasting, by the consensus node, the generated node handover proposal message to the plurality of consensus nodes in the blockchain network; the first master node being one of the plurality of consensus nodes, and the first master node being configured to package and propose a first target block to be added to the blockchain network;
   generating, by the consensus node, when a number of node handover proposal messages obtained in the voting stage is not less than a target number, a node handover voting message;
   broadcasting, by the consensus node, the generated node handover voting messages to the plurality of consensus nodes in the blockchain network; and
   replacing the first master node with a second master node from the plurality of consensus nodes as a new master node of the blockchain network when a number of node handover voting messages obtained by the consensus node in the commit stage is not less than the target number, wherein the second master node is configured to package and propose a second target block to be added to the blockchain network,
   wherein the block proposal message is a message for the first target block; and the method further comprises:
      freezing, when the number of the node handover voting messages obtained in the commit stage is not less than the target number, the first target block in the blockchain network, the first master node being configured to, when the first master node is re-selected as a master node in the blockchain network, add the first target block at a block height corresponding to the first target block in the blockchain network; and
   the plurality of consensus nodes have a polling order; and the replacing the first master node with the second master node comprises:
      determining, according to the polling order, one consensus node in the plurality of consensus nodes adjacent to the first master node and following the first master node to be the second master node.

2. The method according to claim 1, wherein the generating, when a block proposal message generated by a first master node is not obtained in the proposal stage, a node handover proposal message comprises:
   obtaining a proposal blank ballot identifier, when the block proposal message is not obtained in the proposal stage; and
   generating the node handover proposal message according to the proposal blank ballot identifier.

3. The method according to claim 1, wherein the generating, when a number of node handover proposal messages obtained in the voting stage is not less than a target number, a node handover voting message comprises:

obtaining a voting blank ballot identifier when the number of the node handover proposal messages obtained in the voting stage is not less than the target number; and generating the node handover voting message according to the voting blank ballot identifier.

4. The method according to claim 1, wherein the generated node handover proposal message is configured to request master node handover of the first master node in the proposal stage; and the generated node handover voting message is configured to request master node handover of the first master node in the voting stage.

5. The method according to claim 1, wherein the method further comprises:

generating, when the block proposal message for the first target block sent by the first master node is received in the proposal stage and consensus of the block proposal message is successful, a proposal agreement message, and broadcasting the generated proposal agreement message to the plurality of consensus nodes in the blockchain network;

generating, when a number of proposal agreement messages obtained in the voting stage is not less than the target number, a voting agreement message, and broadcasting the generated voting agreement message to the plurality of consensus nodes in the blockchain network; and adding, when a number of voting agreement messages obtained in the commit stage is not less than the target number, the first target block to the blockchain network.

6. The method according to claim 5, wherein the method further comprises:

generating, when the number of the node handover voting messages obtained in the voting stage is less than the target number and the proposal agreement messages obtained in the voting stage is less than the target number, a node handover voting message, and broadcasting the generated node handover voting message to the plurality of consensus nodes in the blockchain network.

7. The method according to claim 6, wherein the generating, when the number of the node handover voting messages obtained in the voting stage is less than the target number and the proposal agreement messages obtained in the voting stage is less than the target number, a node handover voting message comprises:

initiating, when the number of the node handover voting messages obtained in the voting stage is less than the target number and the proposal agreement messages obtained in the voting stage is less than the target number, a timeout waiting mechanism; and generating, in response to that the number of the obtained node handover voting messages is less than the target number and the obtained proposal agreement messages is less than the target number when a target time period ends after initiating the timeout waiting mechanism, the node handover voting message.

8. The method according to claim 5, wherein the method further comprises:

when the number of the node handover voting messages obtained in the commit stage is less than the target number and the number of the voting agreement messages obtained in the commit stage is less than the target number, replacing the first master node with the second master node from the plurality of consensus nodes as the new master node.

9. The method according to claim 8, wherein the replacing the first master node with the second master node comprises:

initiating, when the number of the node handover voting messages obtained in the commit stage is less than the target number and the number of the voting agreement messages obtained in the commit stage is less than the target number, a timeout waiting mechanism; and re-selecting, in response to that the number of the obtained node handover voting messages is less than the target number and the number of the obtained voting agreement messages is less than the target number when a target time period ends after initiating the timeout waiting mechanism, the second master node for replacing the first master node from the plurality of consensus nodes.

10. A data processing apparatus for a blockchain network, the blockchain network supporting data processing of a block consensus service, the block consensus service comprising a proposal stage, a voting stage, and a commit stage, the blockchain network comprising a plurality of consensus nodes, wherein the apparatus is applied to a consensus node among the plurality of consensus nodes, and comprises a memory and a processor coupled to the memory, wherein the processor is configured to:

generate, when a block proposal message generated by a first master node is not obtained in the proposal stage, a node handover proposal message, and broadcast the generated node handover proposal message to the plurality of consensus nodes in the blockchain network; the first master node being one of the plurality of consensus nodes, and the first master node being configured to package and propose a first target block to be added to the blockchain network;

generate, when a number of node handover proposal messages obtained in the voting stage is not less than a target number, a node handover voting message, and broadcast the generated node handover voting message to the plurality of consensus nodes in the blockchain network; and when a number of node handover voting messages obtained by the consensus node in the commit stage is not less than the target number, replace the first master node with a second master node from the plurality of consensus nodes as a new master node of the blockchain network, wherein the second master node is configured to package and propose a second target block to be added to the blockchain network, wherein the block proposal message is a message for the first target block; and the processor is further configured to:

freeze, when the number of the node handover voting messages obtained in the commit stage is not less than the target number, the first target block in the blockchain network, the first master node being configured to, when the first master node is re-selected as a master node in the blockchain network, add the first target block at a block height corresponding to the first target block in the blockchain network; and the plurality of consensus nodes have a polling order; and the replacing the first master node with the second master node comprises:

determining, according to the polling order, one consensus node in the plurality of consensus nodes adjacent to the first master node and following the first master node to be the second master node.

11. The apparatus according to claim 10, wherein the processor is further configured to:
obtain a proposal blank ballot identifier when the block proposal message is not obtained in the proposal stage; and
generate the node handover proposal message according to the proposal blank ballot identifier.

12. The apparatus according to claim 10, wherein the processor is further configured to:
obtain a voting blank ballot identifier when the number of the node handover proposal messages obtained in the voting stage is not less than the target number; and
generate the node handover voting message according to the voting blank ballot identifier.

13. The apparatus according to claim 10, wherein: the generated node handover proposal message is configured to request master node handover of the first master node in the proposal stage; and the generated node handover voting message is configured to request master node handover of the first master node in the voting stage.

14. The apparatus according to claim 10, wherein the processor is further configured to:
generate, when the block proposal message for the first target block sent by the first master node is received in the proposal stage and consensus of the block proposal message is successful, a proposal agreement message, and broadcast the generated proposal agreement message to the plurality of consensus nodes in the blockchain network;
generate, when a number of proposal agreement messages obtained in the voting stage is not less than the target number, a voting agreement message, and broadcast the generated voting agreement message to the plurality of consensus nodes in the blockchain network; and
add, when a number of voting agreement messages obtained in the commit stage is not less than the target number, the first target block to the blockchain network.

15. The apparatus according to claim 14, wherein the processor is further configured to:
generate, when the number of the node handover voting messages obtained in the voting stage is less than the target number and the proposal agreement messages obtained in the voting stage is less than the target number, a node handover voting message, and broadcast the generated node handover voting message to the plurality of consensus nodes in the blockchain network.

16. The apparatus according to claim 15, wherein the processor is further configured to:
initiate, when the number of the node handover voting messages obtained in the voting stage is less than the target number and the proposal agreement messages obtained in the voting stage is less than the target number, a timeout waiting mechanism; and
generate, in response to that the number of the obtained node handover voting messages is less than the target number and the obtained proposal agreement messages is less than the target number when a target time period ends after initiating the timeout waiting mechanism, the node handover voting message.

17. The apparatus according to claim 14, wherein the processor is further configured to:
when the number of the node handover voting messages obtained in the commit stage is less than the target number and the number of the voting agreement messages obtained in the commit stage is less than the target number, replace the first master node with the second master node from the plurality of consensus nodes as the new master node.

18. A non-transitory computer-readable storage medium, the computer-readable storage medium storing a computer program, and the computer program being suitable for being loaded by a processor of a consensus node among a plurality of consensus nodes in a blockchain network,
wherein the blockchain network supports data processing for a block consensus service, the block consensus service comprises a proposal stage, a voting stage, and a commit stage, and the computer program causes the processor of the consensus node to perform:
generating, when a block proposal message generated by a first master node is not obtained in the proposal stage, a node handover proposal message, and broadcasting the generated node handover proposal message to the plurality of consensus nodes in the blockchain network; the first master node being one of the plurality of consensus nodes, and the first master node being configured to package and propose a first target block to be added to the blockchain network;
generating, when a number of node handover proposal messages obtained in the voting stage is not less than a target number, a node handover voting message, and broadcasting the generated node handover voting messages to the plurality of consensus nodes in the blockchain network; and
replacing the first master node with a second master node from the plurality of consensus nodes as a new master node of the blockchain network when a number of node handover voting messages obtained by the consensus node in the commit stage is not less than the target number, wherein the second master node is configured to package and propose a second target block to be added to the blockchain network,
wherein the block proposal message is a message for the first target block; and the computer program causes the processor to perform:
freezing, when the number of the node handover voting messages obtained in the commit stage is not less than the target number, the first target block in the blockchain network, the first master node being configured to, when the first master node is re-selected as a master node in the blockchain network, add the first target block at a block height corresponding to the first target block in the blockchain network; and
the plurality of consensus nodes have a polling order; and the replacing the first master node with the second master node comprises:
determining, according to the polling order, one consensus node in the plurality of consensus nodes adjacent to the first master node and following the first master node to be the second master node.

* * * * *